United States Patent [19]

Moser

[11] 4,386,164
[45] May 31, 1983

[54] BARIUM-FREE TYPE I, CLASS B LABORATORY SODA-ALUMINA-BOROSILICATE GLASS

[75] Inventor: Herbert S. Moser, Vineland, N.J.

[73] Assignee: Owens-Illinois, Inc., Toledo, Ohio

[21] Appl. No.: 330,741

[22] Filed: Dec. 14, 1981

[51] Int. Cl.$^3$ ............................................... C03C 3/08
[52] U.S. Cl. .......................................... 501/66; 65/61; 501/56
[58] Field of Search ............................. 501/66; 65/61

[56] References Cited

U.S. PATENT DOCUMENTS 3,054,686 9/1962 Hagedorn ............................. 501/66
3,985,535 10/1976 Bennett et al. ......................... 65/61

FOREIGN PATENT DOCUMENTS 616263 1/1961 Italy ....................................... 501/66
412156 1/1974 U.S.S.R. ................................ 501/66

Primary Examiner—Helen M. McCarthy
Attorney, Agent, or Firm—Richard D. Heberling; Myron E. Click; David H. Wilson

[57] ABSTRACT

There is disclosed a barium-free Type I, Class B laboratory glass according to the standard specification set forth in ASTM E 438-80a having a linear coefficient of expansion (0° to 300° C., cm/cm·°C. $\times 10^{-7}$) of about 48 to 56 and having a chemical durability, maximum titration equivalent of: 0.2N $H_2SO_4$/10 g of glass of 1.0 ml, the composition consisting essentially of the following ingredients in approximate percent by weight:

| Ingredient | Percent |
|---|---|
| $SiO_2$ | 70–74 |
| $B_2O_3$ | 9–13 |
| $Al_2O_3$ | 5–8 |
| $Na_2O$ | 5–8 |
| $K_2O$ | 0–4 |
| CaO | 0–3 |
| MgO | 0–1 | the glass composition having an annealing point of about 550° C. to 585° C., a liquidus of about 1730° F. to 1760° F. and a Log n at the liquidus about 5.0 to 5.5.

4 Claims, No Drawings

BARIUM-FREE TYPE I, CLASS B LABORATORY SODA-ALUMINA-BOROSILICATE GLASS

BACKGROUND OF THE INVENTION

The present invention relates to Type I, Class B laboratory glasses as set forth in the standard specification in ASTM E 438–80a and particularly relates to barium-free soda-alumina-borosilicate laboratory glasses especially useful for pharmaceutical glass containers including ampuls, vials and syringes.

As set forth in ASTM E 438–80a (Standard Specification for Glasses in Laboratory Apparatus), Type I, Class B alumino-borosilicate laboratory glasses have the following chemical and physical requirements:

|  | Weight Percent |
|---|---|
| Chemical Requirements | |
| Major Constituents, Approx. | |
| $SiO_2$ | 73 |
| $B_2O_3$ | 10 |
| $Al_2O_3$ | 7 |
| BaO | 2 |
| CaO | 1 |
| $Na_2O$ | 6 |
| $K_2O$ | 1 |
| Trace Constituents, Max. | |
| $As_2O_2$ plus $Sb_2O_3$ | 0.1 |
| PbO | 0.1 |
| MgO | 0.3 |
| ZnO | 0.1 |
| All other constituents, max. | 1.0 |
| Physical Requirements | |
| Linear coefficient of expansion, 0 to 300° C. cm/cm − °C. × $10^{-7}$ | 48 to 56 ± 2 |
| Annealing point, °C. | 574 ± 10 |
| Softening point, °C. | 783 to 799 ± 10 |
| Density, annealed, $g/cm^3$ | 2.36 ± 0.02 |
| Chemical durability, titration equivalent of: 0.02N $H_2SO_9$/10g of glass, max. ml | 1.0 |

It is desirable to have a laboratory glass for pharmaceutical containers made from a soda-alumina borosilicate glass composition that can be melted and fabricated into containers such as ampuls or vials with speed suitable for economical production. According to ASTM E 438–80a, a particular composition provides such a glass with an outstanding balance of chemical and physical properties including high chemical durability and a relatively low thermal coefficient of expansion.

However, during storage of the pharmaceutical containers, it is believed that barium from BaO in the glass may leach out very slowly in very small amounts and may react with minute quantities of sulfate or phosphate ions in the drug product to form precipitates which destroy the integrity of the product.

Hence, it is an object of the present invention to provide a barium-free glass composition that meets the relatively strict requirements of ASTM E 438–80a and that can be melted and fabricated economically by known tube drawing processes such as the Danner or downdraw processes.

It is an object of the present invention to provide a barium-free Type I, Class B laboratory glass according to the standard specification set forth in ASTM E 438–80a having a linear coefficient of expansion (0° to 300° C., cm/cm − °C. × $10^{-7}$) of about 48 to 56 and having a chemical durability, maximum titration equivalent of: 0.02 N $H_2SO_4$/10 g of glass of 1.0 ml, the composition consisting essentially of the following ingredients in approximate percent by weight:

| Ingredient | Percent |
|---|---|
| $SiO_2$ | 70–74 |
| $B_2O_3$ | 9–13 |
| $Al_2O_3$ | 5–8 |
| $Na_2O$ | 5–8 |
| $K_2O$ | 0–4 |
| CaO | 0–3 |
| MgO | 0–1 | the glass composition having an annealing point of about 550° C. to 585° C., a liquidus of about 1730° F. to 1760° F. and a Log n at the liquidus about 5.0 to 5.5.

It is an object of the present invention to provide a barium-free glass composition that meets the requirements of ASTM E 438–80a and yet can be economically processed into pharmaceutical containers, the composition having the following ingredients in approximate percent by weight:

| Ingredient | Percent |
|---|---|
| $SiO_2$ | 71.8 |
| $B_2O_3$ | 11.5 |
| $Al_2O_3$ | 6.8 |
| $Na_2O$ | 6.4 |
| $K_2O$ | 2.7 |
| CaO | 0.5 |
| MgO | 0.2 | the glass composition having the following properties:

| Property | Approximate Units |
|---|---|
| Working Point (°C.) | 1135 |
| Softening Point (°C.) | 782 |
| Annealing Point (°C.) | 560 |
| Strain Point (°C.) | 516 |
| Expansion Coefficient (× $10^{-7}$) | 54 |
| Density (g/cc) | 2.335 |
| Chemical Durability (ml) | 0.34 |
| Viscosity, log 5 (°F.) | 1815 |
| Viscosity, log 3 (°F.) | 2470 |
| Liquidus (°F.) | 1740 |
| Log n at Liquidus | 5.4 |

These and other objects are accomplished according to the specification that follows and the appended claims.

THE INVENTION

The present invention provides a barium-free Type I, Class B laboratory glass that conforms to the standard specification set forth in ASTM E 438–80a in which the glass has a linear coefficient of expansion (0° to 300° C., cm/cm − °C. × $10^{-7}$) of about 48 to 56 and having a chemical durability, maximum titration equivalent of: 0.02 N $H_2SO_4$/10 g of glass of 1.0 ml, the composition consisting essentially of the following ingredients in approximate percent by weight:

| Ingredient | Percent |
|---|---|
| $SiO_2$ | 70–74 |
| $B_2O_3$ | 9–13 |
| $Al_2O_3$ | 5–8 |
| $Na_2O$ | 5–8 |
| $K_2O$ | 0–4 |
| CaO | 0–3 |

| Ingredient | Percent |
| --- | --- |
| MgO | 0-1 | the glass composition having an annealing point of about 550° C. to 585° C. and a liquidus of about 1730° F. to 1760° F.

The present invention provides a preferred barium-free Type I, Class B (ASTM E 438–80a) glass composition, the composition having the following ingredients in approximate percent by weight:

| Ingredient | Percent |
| --- | --- |
| $SiO_2$ | 71-73 |
| $B_2O_3$ | 10-12 |
| $Al_2O_3$ | 6-7 |
| $Na_2O$ | 6-7 |
| $K_2O$ | 1-3 |
| CaO | 0.2-2 |
| MgO | 0.1-0.3 |

The present invention provides a highly preferred barium-free Type I, Class B (ASTM E 438–80a) glass with outstanding properties, the composition having the following ingredients in approximate percent by weight:

| Ingredient | Percent |
| --- | --- |
| $SiO_2$ | 71.8 |
| $B_2O_3$ | 11.5 |
| $Al_2O_3$ | 6.8 |
| $Na_2O$ | 6.4 |
| $K_2O$ | 2.7 |
| CaO | 0.5 |
| MgO | 0.2 | the glass composition having the following properties:

| Property | Approximate Units |
| --- | --- |
| Working Point (°C.) | 1135 |
| Softening Point (°C.) | 782 |
| Annealing Point (°C.) | 560 |
| Strain Point (°C.) | 516 |
| Expansion Coefficient ($\times 10^{-7}$) | 54 |
| Density (g/cc) | 2.335 |
| Chemical Durability (ml) | 0.34 |
| Viscosity, log 5 (°F.) | 1815 |
| Viscosity, log 3 (°F.) | 2470 |
| Liquidus (°F.) | 1740 |
| Log n at Liquidus | 5.4 |

The present invention also provides another highly preferred glass composition, although for some purposes such as high chemical durability and high-speed production, not as outstanding as the preceding composition. This barium-free glass composition has the following ingredients in approximate percent by weight:

| Ingredient | Percent |
| --- | --- |
| $SiO_2$ | 70.6 |
| $B_2O_3$ | 11.7 |
| $Al_2O_3$ | 6.6 |
| $Na_2O$ | 6.1 |
| $K_2O$ | 2.5 |
| CaO | 2.2 |
| MgO | 0.2 | the glass composition having the following properties:

| Property | Approximate Units |
| --- | --- |
| Working Point (°C.) | 1118 |
| Softening Point (°C.) | 779 |
| Annealing Point (°C.) | 574 |
| Strain Point (°C.) | 532 |
| Expansion Coeffecient ($\times 10^{-7}$) | 55 |
| Density (g/cc) | 2.348 |
| Chemical Durability (ml) | 0.49 |
| Viscosity, log 5 (°F.) | 1795 |
| Viscosity, log 3 (°F.) | 2435 |
| Liquidus (°F.) | 1760 |
| Log n at Liquidus | 5.2 |

The following example illustrates the present invention and is not intended to be limiting in any way.

EXAMPLE

Two barium-free ASTM E 438–80a soda-alumina-borosilicate glass compositions were made from glass raw batch materials consisting of sand, borax, boric acid, burnt dolomite lime, feldspar, potassium nitrate and sodium chloride, by methods well known in the art. The raw batches were melted and fired as known in the art to produce glasses A and B with the following chemical compositions in approximate percentages by weight and with the following chemical and physical properties as set forth in Table I.

TABLE I

| | CHEMICAL AND PHYSICAL PROPERTIES | | | | |
| --- | --- | --- | --- | --- | --- |
| | A | | B | | ASTM E 438 - 80a |
| | Measured | Calculated | Measured | Calculated | Standard Glass |
| Chemical Composition (%) | | | | | |
| Silica ($SiO_2$) | 71.93 | 71.80 | 70.35 | 70.60 | 70.6 |
| Boric Oxide ($B_2O_3$) | 11.62 | 11.55 | 12.00 | 11.70 | 11.2 |
| Alumina ($Al_2O_3$) | 6.69 | 6.75 | 6.40 | 6.60 | 6.6 |
| Barium Oxide (BaO) | None | None | None | None | 2.2 |
| Calcium Oxide (CaO) | 0.43 | 0.50 | 2.30 | 2.20 | 0.5 |
| Magnesium Oxide (MgO) | 0.21 | 0.20 | 0.01 | 0.20 | 0.2 |
| Sodium Oxide ($Na_2O$) | 6.61 | 6.40 | 6.35 | 6.10 | 6.1 |
| Potassium Oxide ($K_2O$) | 2.49 | 2.70 | 2.29 | 2.50 | 2.5 |
| Chloride ($Cl^-$) | 0.17 | 0.10 | 0.22 | 0.10 | 0.1 |
| $0 \simeq Cl$ | 0.04 | | 0.05 | | |
| Total | 100.11 | | 99.87 | | |
| Physical Properties | | | | | |
| Working Point (°C.) | 1135 | 1135 | 1118 | 1124 | 1130 |
| Softening Point (°C.) | 782 | 788 | 779 | 788 | 785 |
| Annealing Point (°C.) | 560 | | 574 | | 575 |

TABLE I-continued

| | CHEMICAL AND PHYSICAL PROPERTIES | | | | ASTM E 438 - 80a |
|---|---|---|---|---|---|
| | A | | B | | |
| | Measured | Calculated | Measured | Calculated | Standard Glass |
| Strain Point (°C.) | 516 | | 532 | | 530 |
| Expansion Coefficient, 0–300° C. ($\times 10^{-7}$) | 54.3 | 54.7 | 55.2 | 55.5 | 55 |
| Contraction Coefficient, A.P. - 25° C. ($\times 10^{-7}$) | 68.1 | | 71.2 | | 73 |
| Density (g/cc) | 2.3335 | | 2.3476 | | 2.374 |
| Refractive Index ($n_D$) | 1.4904 | | 1.4948 | | 1.495 |
| Chemical Durability, USP XX (ml 0.02N acid) | 0.34 | | 0.49 | | 0.36 |
| Cooling Time (sec.) | 79 | 79 | 78 | 77 | 79 |
| Viscosity (°F.): | | | | | |
| Log n = 7.6 | 1440 | | 1435 | | 1445 |
| 7.0 | 1505 | 1505 | 1495 | 1500 | 1500 |
| 6.0 | 1635 | 1640 | 1625 | 1635 | 1635 |
| 5.0 | 1815 | 1825 | 1795 | 1810 | 1815 |
| 4.0 | 2075 | 2075 | 2045 | 2055 | 2070 |
| 3.0 | 2470 | 2470 | 2435 | 2430 | 2460 |
| 2.5 | 2765 | | 2725 | | 2740 |
| 2.0 | 3165 | 3145 | 3125 | 3085 | 3120 |
| Liquidus (°F.) | 1741 | | 1758 | | 1754 |
| Log n at Liquidus | 5.41 | | 5.22 | | 5.35 |
| Primary Phase | Tridymite | | Tridymite | | Tridymite |

The barium-free compositions A and B of the present invention are compared to an ASTM E 438-80a standard glass (made according to that standard specification with BaO). Compositions A and B compared closely with the standard composition in physical properties such as liquidus, chemical durability, annealing point, brilliance, workability and flake proneness. The agreement of the properties of composition A and the standard glass in the important properties of viscosity, expansion coefficient and chemical durability is especially close.

The glasses were fabricated into pharmaceutical containers, the forming characteristics, surface durability, lack of proneness to flaking, the lack of blooming, and the ampul break force characteristics being satisfactory.

Yet, glass compositions A and B contained no barium oxide. Surprisingly, the requirement of economical fabrication into glass containers and the strict requirements of ASTM E 438-80a were satisfied.

In the Hagedorn U.S. Pat. No. 3,054,686, there is disclosed modified borosilicate glasses suitable for the manufacture of small containers for packaging pharmaceutical and drug products. The Hagedorn patent sets forth the following theoretical glass composition in percent by weight.

| Ingredient | Percent |
|---|---|
| SiO$_2$ | 67–71 |
| Al$_2$O$_3$ | 2.5–6.0 |
| B$_2$O$_3$ | 2.0–5.0 |
| CaO + MgO | 6.0–10.0 |
| BaO | 0–2.0 |
| Na$_2$O | 10.5–14.5 |
| K$_2$O | 0.1–2.0 |
| Li$_2$O | 0–1.0 |
| Cl | 0–0.2 |
| SO$_3$ | 0–0.2 |

In the above Hagedorn formulation, the amounts of CaO+MgO and the amount of Na$_2$O are too high to provide the outstanding glass compositions of the present invention. The outstanding combination of properties obtained by the glass composition of the present invention (that meet the ASTM E 438-80a specification) is not disclosed in the Hagedorn U.S. Pat. No. 3,054,686 glasses. As previously stated, the thermal expansion coefficient is an important property. It is critical in meeting the ASTM E 438-80a specification. The thermal expansion coefficient of the Hagedorn glasses is much higher than the coefficient of the glasses of the present invention, being in the range of 74–85.

Also in another important property, the chemical durability of the Hagedorn glasses, being in the range of 1.7–5.0 ml, is not as good as the glasses of the present invention and does not meet the Type I requirements of ASTM E 438-80a.

What is claimed is:

1. A barium-free Type I, Class B laboratory glass according to the standard specification set forth in ASTM E 438-80a having a linear coefficient of expansion (0° to 300° C., cm/cm−°C.$\times 10^{-7}$) of about 48 to 56 and having a chemical durability, maximum titration equivalent of: 0.02 N H$_2$SO$_4$/10 g of glass of 1.0 ml, the composition consisting essentially of the following ingredients in approximate percent by weight:

| Ingredient | Percent |
|---|---|
| SiO$_2$ | 70–74 |
| B$_2$O$_3$ | 9–13 |
| Al$_2$O$_3$ | 5–8 |
| Na$_2$O | 5–8 |
| K$_2$O | 0–4 |
| CaO | 0–3 |
| MgO | 0–1 | the glass composition having an annealing point of about 550° C. to 585° C., a softening point of about 783° to 799° C., a liquidus of about 1730° F. to 1760° F. and a Log n at the liquidus about 5.0 to 5.5.

2. A glass composition as defined in claim 1 having the following ingredients in approximate percent by weight:

| Ingredient | Percent |
|---|---|
| SiO$_2$ | 71–73 |
| B$_2$O$_3$ | 10–12 |
| Al$_2$O$_3$ | 6–7 |
| Na$_2$O | 6–7 |

-continued

| Ingredient | Percent |
|---|---|
| $K_2O$ | 1-3 |
| CaO | 0.2-2 |
| MgO | 0.1-0.3 |

3. A glass composition as defined in claim 1 having the following ingredients in approximate percent by weight:

| Ingredient | Percent |
|---|---|
| $SiO_2$ | 71.8 |
| $B_2O_3$ | 11.5 |
| $Al_2O_3$ | 6.8 |
| $Na_2O$ | 6.4 |
| $K_2O$ | 2.7 |
| CaO | 0.5 |
| MgO | 0.2 | the glass composition having the following properties:

| Property | Approximate Units |
|---|---|
| Working Point (°C.) | 1135 |
| Softening Point (°C.) | 782 |
| Annealing Point (°C.) | 560 |
| Strain Point (°C.) | 516 |
| Expansion Coefficient ($\times 10^{-7}$) | 54 |
| Density (g/cc) | 2.335 |
| Chemical Durability (ml) | 0.34 |
| Viscosity, log 5 (°F.) | 1815 |
| Viscosity, log 3 (°F.) | 2470 |
| Liquidus (°F.) | 1740 |
| Log n at Liquidus | 5.4 |

4. A glass composition as defined in claim 1 having the following ingredients in approximate percent by weight:

| Ingredient | Percent |
|---|---|
| $SiO_2$ | 70.6 |
| $B_2O_3$ | 11.7 |
| $Al_2O_3$ | 6.6 |
| $Na_2O$ | 6.1 |
| $K_2O$ | 2.5 |
| CaO | 2.2 |
| MgO | 0.2 | the glass composition having the following properties:

| Property | Approximate Units |
|---|---|
| Working Point (°C.) | 1118 |
| Softening Point (°C.) | 779 |
| Annealing Point (°C.) | 574 |
| Strain Point (°C.) | 532 |
| Expansion Coeffecient ($\times 10^{-7}$) | 55 |
| Density (g/cc) | 2.348 |
| Chemical Durability (ml) | 0.49 |
| Viscosity, log 5 (°F.) | 1795 |
| Viscosity, log 3 (°F.) | 2435 |
| Liquidus (°F.) | 1760 |
| Log n at Liquidus | 5.2 |

* * * * *